Patented July 28, 1936

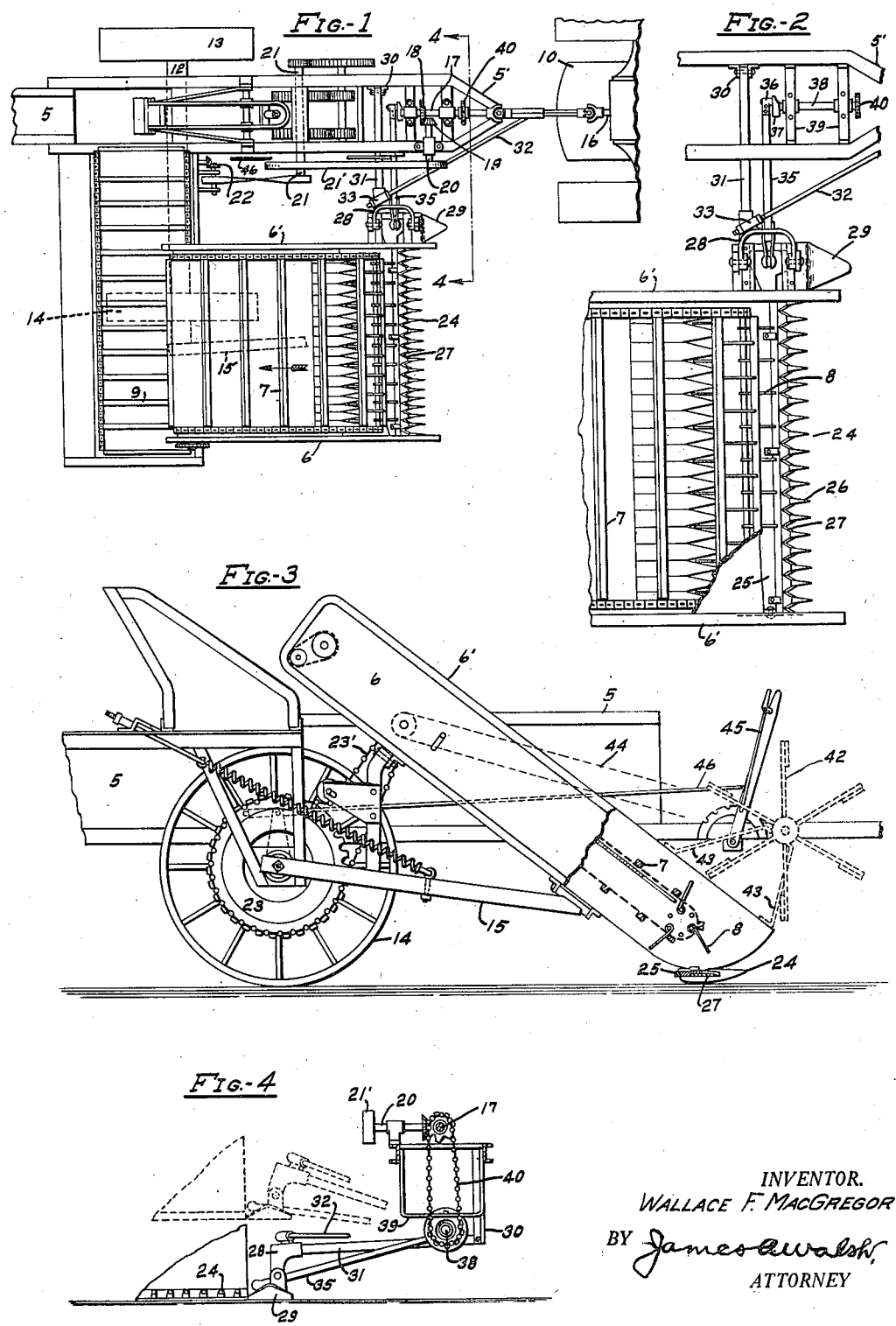

2,048,940

UNITED STATES PATENT OFFICE 2,048,940

COMBINATION PICK-UP AND BALER

Wallace F. MacGregor, Racine, Wis., assignor to J. I. Case Company, Racine, Wis., a corporation Application October 27, 1933, Serial No. 695,389

9 Claims. (Cl. 56—23)

My present invention relates to the type of baling machinery disclosed in Letters Patent No. 1,919,897, issued July 25, 1933, and consists in certain improvements whereby the utility of the pick-up baler is materially increased so that it may be adapted to function in uncut as well as cut grain and other crops. It is my object, therefore, to so improve such machinery that as it is drawn through the field it will simultaneously cut, gather and bale material, for example, the stubble of small grain crops such as wheat, barley and the like from which the grain has been harvested by a combine or other machine, corn stalks from which the ears may or may not have been picked, alfalfa or other hay crops, green crops to be used for immediate consumption, or any other crop from which moisture has been reduced sufficiently to be in condition for baling as it is being cut and gathered in the field.

In the accompanying drawing, forming part hereof, Figure 1 is a plan view of baling machinery including my improvements; Fig. 2, a detail plan view on an enlarged scale of a portion of the machine; Fig. 3, a side elevation of the pick-up, a portion thereof being broken away to show the carrier and cutting attachment employed therewith; and Fig. 4 is a detail section taken on the dotted line 4—4 in Fig. 1.

In said drawing the numeral 5 indicates the baler, 6 the pick-up including a carrier 7 and rotatable fingers 8 cooperating with the carrier, 9 a cross-conveyer for delivering materal from the pick-up to the baler, and 10 a tractor for drawing and operating the baling machinery.

The baler is supported by the axle 12 having wheels 13, 14, thereon, to which axle a push-bar 15 is connected, and which latter, with other supports substantially as shown in said patent, maintain the pick-up in inclined position. The baler frame 5' is attached to the drawbar of tractor 10 in any suitable manner, the latter including a power take-off shaft 16 connected to the shaft 17 having a gear 18 thereon meshing with gear 19 on stud-shaft 20, the stud-shaft being connected to shaft 21 by a driving system 21' for actuating the baling mechanisms of the baler, and which shaft 21 in turn is connected to a gear system 22 for driving the cross-conveyer 9, it being understood that the pick-up 6 is actuated by the wheel 14 and sprocket-and-chain system 23, 23', associated therewith, or otherwise as may be desired.

When employing the baling machinery for harvesting uncut crops I detachably mount a mower 24 on the forward end of the pick-up, supporting the same by the side walls 6' of the pick-up, the mower comprising a cutter-bar 25 having the usual guard fingers 26 between which the cutting mechanism 27 operates, and to which mower a coupling yoke 28 is connected and pivotally carries a shoe 29, the mower being pivotally connected, at 30, to the frame 5' by a coupling-bar 31. Said yoke 28 is also further braced by a diagonally arranged thrust-rod 32 connected to the yoke, at 33, and which is pivotally connected to the forward end of frame 5'. A pitman 35 is releasably connected to the cutting mechanism, as is common, and its opposite end is pivotally secured to a wrist-pin 36 eccentrically carried on fly-wheel 37, the latter in turn being mounted on a shaft 38 in supports 39 beneath power shaft 17 connected to the frame 5' and which fly-wheel is driven by a sprocket-and-chain system 40 connecting the shaft 17 with shaft 38, as indicated in Fig. 4 showing the mower in dotted lines as being vertically adjusted, certain parts being omitted from Fig. 2 for clearly showing the assemblage of the pitman 35 and its drive-shaft 38.

To facilitate removal of the uncut crop from the field as it is being cut by the mower I may provide a reel 42 of well known or suitable character, as indicated in Fig. 3, or other means, for directing straw or other material downwardly in the direction of the carrier 7 so that it will fall thereon with certainty when severed, and in the use of a reel the same may be supported on the pick-up by braces 43 and rotated by a belt or chain 44 connected to any suitable source of power forming part of the machinery.

I claim as my invention:

1. In baling machinery, the combination, with a baler, of a support extending from the baler, a pick-up connected to the support and arranged for gathering cut material from the ground, means associated with the support for actuating the pick-up, cutting mechanism removably mounted on the forward end of the pick-up and detachably connected to the baler for cutting material to be gathered by the pick-up as an alternative manner of harvesting, a coupling-rod pivotally connected to the baler and hingedly connected to the cutting mechanism, a pitman connecting the baler with the cutting mechanism, and means connecting the pitman with a source of power on the baler for actuating said pitman to operate the cutting mechanism.

2. In baling machinery, the combination, with a baler, of a support extending therefrom, a pick-up mounted on said support and arranged for gathering cut material from the ground, means associated with the support for actuating the pick-up, a cross-conveyer adjacent the pick-up for conveying material therefrom and discharging it into the baler, means connected with the baler and the conveyer for actuating the latter, cutting mechanism detachably secured to the baler and to the forward end of the pick-up and arranged for cutting material to be gathered by the pick-up as an alternative manner of harvesting, hinge means for connecting the cutting mechanism with the baler, means on the baler and connected to the cutting mechanism for actuating the latter, and means on the baler and connected to said support for vertically adjusting the pick-up and the cutting mechanism secured thereto.

3. In baling machinery, the combination of detachable means for cutting material, a pick-up for receiving the cut material from the cutting means and conveying the same therefrom, said pick-up being adapted to gather material from the ground when said detachable cutting means is removed, means for receiving the conveyed material from the pick-up, a baler into which said receiving means delivers the material to be baled, means associated with the baler for supporting the pick-up, means associated with the support for actuating the pick-up, means for actuating the cutting means, and means for actuating the receiving means, all of said actuating means operating simultaneously to cut, convey and bale material.

4. In baling machinery, the combination of detachable means for cutting material, means for directing the material toward the cutting means, a pick-up for receiving the cut material from the cutting means and conveying the same therefrom, said pick-up being adapted to gather material from the ground when said detachable cutting means is removed, means for receiving the conveyed material from the pick-up, a baler into which said receiving means delivers the material to be baled, means associated with the baler for supporting the pick-up, means associated with the support for actuating the pick-up, means for actuating the directing means, means for actuating the cutting means, and means for actuating the receiving means, all of said actuating means operating simultaneously to cut, convey and bale material.

5. In baling machinery, the combination, with a baler, of a pick-up arranged for gathering material from the ground, and including a conveyer positioned in lateral relation to the baler, means associated with the baler for supporting the pick-up, means detachably connected to the baler and the pick-up for cutting material left standing in a field after a crop has been cut and removed and delivering the material to the conveyer, mechanism for operatively connecting the cutting means to the baler, means associated with the baler for actuating said connecting mechanism, and means associated with the support and operatively connected to the pick-up for actuating the latter.

6. The combination, with a baler, of a pick-up arranged for gathering material directly from the ground, and including a conveyor positioned in lateral relation to the baler, means associated with the baler for supporting the pick-up, means detachably and flexibly connected to the baler and the pick-up for cutting material left standing in a field after a crop has been cut and removed and delivering the material to the conveyor, a shaft on the baler, a pitman connecting the shaft to the cutting means, means connecting said shaft to a source of power on the baler for actuating the pitman to operate the cutting means, and means associated with the support and operatively connected to the pick-up for actuating the latter.

7. The combination, with a traveling baler, of means including a pick-up device extending laterally of said baler and arranged for picking up cut material from the ground, and a conveyer positioned and arranged to receive material from said pick-up and to convey it to said baler, said means including mechanism for driving said pick-up and conveyer from movements of said baler, detachable cutting means arranged to be carried by said baler in advance of the pick-up to cut additional material in the path of the pick-up, and a separate power source and connections arranged to actuate said cutting means.

8. An attachment for a pick-up baler comprising a cutter-bar, pivotal connections arranged to carry said bar extended substantially at right angles to the baler and in advance of the pick-up means thereof and to allow free floating up-and-down movement of said bar, cutting mechanism associated with said cutter bar, a power source for driving said mechanism, and connections from said power source for driving said mechanism without interfering with said free floating movement.

9. The combination, with a traveling baler, of means including a pick-up device extending laterally of said baler and arranged for picking up cut material from the ground and a conveyer positioned and arranged to receive material from said pick-up and to convey it to the baler, detachable cutting means arranged to be carried by said baler in advance of said pick-up to cut additional material in the path of the pick-up, a power source, and connections arranged to actuate said cutting means.

WALLACE F. MacGREGOR.